US010341013B2

(12) United States Patent
Zacharia et al.

(10) Patent No.: US 10,341,013 B2
(45) Date of Patent: Jul. 2, 2019

(54) SYSTEM AND METHOD FOR MOBILE COMMUNICATION THROUGH GEOSTATIONARY SATELLITES

(71) Applicant: HISKY SCS LTD., Rosh Haayin (IL)

(72) Inventors: Berejik Zacharia, Tel Aviv (IL); Mordechai Litochevski, Zichron Ya'akov (IL); Shahar Kravitz, Tel Aviv (IL)

(73) Assignee: HISKY SCS LTD, Park Afek, Rosh Haayin (IL)

( * ) Notice: Subject to any disclaimer, the term of this patent is extended or adjusted under 35 U.S.C. 154(b) by 39 days.

(21) Appl. No.: 15/525,184

(22) PCT Filed: Apr. 17, 2016

(86) PCT No.: PCT/IL2016/050401
§ 371 (c)(1),
(2) Date: May 8, 2017

(87) PCT Pub. No.: WO2016/178208
PCT Pub. Date: Nov. 10, 2016

(65) Prior Publication Data
US 2018/0287695 A1 Oct. 4, 2018

(30) Foreign Application Priority Data
May 4, 2015 (IL) .......................................... 238612

(51) Int. Cl.
*H04B 7/185* (2006.01)
(52) U.S. Cl.
CPC ..... *H04B 7/18545* (2013.01); *H04B 7/18517* (2013.01)
(58) Field of Classification Search
None
See application file for complete search history.

(56) References Cited

U.S. PATENT DOCUMENTS 5,548,292 A 8/1996 Hirshfield et al.
5,619,503 A 4/1997 Dent
(Continued)

FOREIGN PATENT DOCUMENTS

EP 1058410 A2 12/2000
EP 1739449 A1 1/2007
(Continued)

OTHER PUBLICATIONS

International Search Report for International Application No. PCT/IL2016/050401 dated Nov. 14, 2016.

*Primary Examiner* — Mohammed Rachedine
(74) *Attorney, Agent, or Firm* — Dorsey & Whitney LLP

(57) ABSTRACT

A system and a method for use in satellite communication are presented. The system comprising (a) one or more antenna units for receiving and transmitting electromagnetic radiation in selected frequency ranges, (b) a modem unit configured for modulating received input signals and modulating output electronic data to signals to be transmitted, (c) a processor unit connected to said one or more antenna units and to said modem unit. The processor unit comprises: antenna orientation optimizer module configured and operable for varying azimuth and elevation of signal transmission and reception the antenna units; and network registration module configured and operable for registering the system to a communication network. The registering comprising: selecting a free private communication channel provided by the network, generating a corresponding signal sequence for transmission to a hub. The registering module is configured to be responsive to appropriate notification signals in said private communication channel.

16 Claims, 3 Drawing Sheets

(56) References Cited

U.S. PATENT DOCUMENTS

| | | | |
|---|---|---|---|
| 5,659,545 | A | 8/1997 | Sowles et al. |
| 6,023,242 | A | 2/2000 | Dixon |
| 6,127,967 | A | 10/2000 | Ghazvinian et al. |
| 6,591,084 | B1 | 7/2003 | Chuprun et al. |
| 6,640,085 | B1 | 10/2003 | Chatzipetros et al. |
| 7,379,707 | B2 | 5/2008 | DiFonzo et al. |
| 7,450,901 | B2 | 11/2008 | Parkman |
| 8,681,804 | B2 * | 3/2014 | Greene ................ H04W 92/02 370/406 |
| 9,756,549 | B2 * | 9/2017 | Perdomo ............... H04W 40/12 |
| 2002/0111174 | A1 | 8/2002 | Judson et al. |
| 2014/0013361 | A1 | 1/2014 | Monari et al. |

FOREIGN PATENT DOCUMENTS

| | | |
|---|---|---|
| WO | 1998029967 | 7/1998 |
| WO | 2012004786 | 1/2012 |

* cited by examiner

SYSTEM AND METHOD FOR MOBILE COMMUNICATION THROUGH GEOSTATIONARY SATELLITES

TECHNOLOGICAL FIELD

The present invention is in the field of communication devices and methods. The invention relates to satellite based mobile communication systems.

BACKGROUND

Mobile communications systems have been widely used in the past few decades. Pluralities of cellular communication servers are deployed in populated regions around the world, and thus provide a global communication network. However, such cellular communication systems are limited to regions where suitable servers and antennas are deployed.

In various situations, reliable communication is required even at remote locations where no cellular antennas are present at a distance which would enable reception. Telephonic communication through satellites allows a user to be located almost at any corner of the globe while being available for incoming calls, or capable of making outgoing calls. Current commercially available mobile satellite phones utilize communication through dedicated low-orbit satellites allowing global coverage and efficient communication with low gain transmission systems.

Well known is the Iridium Inc. satellite communication system which utilizes 66 active satellite units, as well as additional "spare" units for use in case of failure of one or more of the active satellites. The satellites are located in low orbit to allow communication with handheld mobile devices of relatively small dimensions. The Iridium communication system utilizes several additional inactive satellites located in orbit. These satellites are used as spares to provide coverage in case of failure of one or more of the active satellites.

Other satellite phone devices require high gain antennas for reliable communication through satellites in orbit. For example, U.S. Pat. No. 6,023,242 describes an Earth station having an antenna configured to establish communication with a satellite. The Earth station stores a table of satellite position data for a plurality of satellites and is configurable to enable its own location position on the surface of the Earth as well as the azimuth and elevation of its antenna to be obtained. The tabulated satellite position data is then utilized to calculate the position of the satellite in relation to the location position. Thereafter at least one of the satellites is selected with which to establish communication and in response to the selection and the obtained azimuth and elevation, a direction is determined in which to configure the antenna for operation with the at least one selected satellite. Following determination of the direction, the antenna is configured for operation with the at least one selected satellite. The location position and the azimuth and elevation of the antenna may be determined through the Earth station comprising a GPS receiver. The Earth station may be configured as a mobile, portable or fixed unit and the invention is configurable to enable communication to be established with geostationary satellites, non-geostationary satellites or a combination of both geostationary and non-geostationary satellites.

GENERAL DESCRIPTION

There is a need in the art for a novel technique and system for use in mobile communication while providing effective global coverage. Moreover, there is a need for a handheld mobile satellite communication device suitable for providing reliable communication while it moves, as well as providing sufficient operation time utilizing a mobile power supply.

Currently existing mobile satellite communication systems utilizing dedicated satellites require high investment in deployment of satellites in orbit for sufficient coverage, as well as periodic maintenance and satellite exchange in case of malfunction. Alternatively, communication systems utilizing geostationary satellites are typically large, high on energy consumption and require proper orientation for communication through geostationary satellites. These requirements greatly reduce mobility of the communication system. It should be noted that, and as generally known, a mobile communication system is generally described as a system allowing continuous communication even while it moves. This is contrary to a portable communication system, which although it can be moved, requires to be stationary for proper operation.

The inventors of the present invention have found that to provide a compact, mobile and efficient communication system capable of transmitting data through suitable satellites and generally through geostationary satellites, a proper tradeoff should be addressed between transmission and reception gain and communication bit rate. The satellite communication system of the invention is generally configured to provide light, energy efficient and a mobile device for voice and data communication with an appropriate hub through one or more satellites. Preferably, the communication device may be in suitable dimensions to be handheld, while providing bilateral communication from effectively every location on the globe. The device may comprise one or two antenna units suitable for receiving input signals arriving from a satellite as well as transmitting output data to such a satellite. The antenna unit(s) is/are connected to a modem unit, which in turn is connected to a processor unit configured and operable for operating the device in accordance with a user generated operation profile. Typically, the device may also comprise a power storage unit, e.g. a battery, while additionally or alternatively, the device may be connectable to an external power supply. It should be noted that the technique of the present invention may me used for communication through geostationary satellites as well as other orbiting satellites having predetermined known trajectory. For simplicity the technique of the invention is described herein below as referring to geostationary satellites, however it should be understood that non geostationary satellites may also be used. More specifically, as a geostationary satellite has a fixed location relative to a given point of the surface of the earth, any other satellite may be used, given a known trajectory relative to a given point on the surface of the earth.

To provide the desired small form factor, as well as to allow communication through a geostationary satellite, the antenna unit(s) may preferably be configured as phased array antenna unit(s). Such a phased array antenna unit comprises an array of antenna elements configured to transmit signals with appropriately tailored phase difference between them, thus providing electronic beam steering for transmitted signals. Additionally, the phased array antenna unit allows for selectively collecting input signals arriving from desired directions. To this end, proper phase relations applied to input data collected by the different elements of the array act as amplification to signals having similar phase relations when arriving to the antenna elements and allow resolving of the desired collected signals.

The processor unit may comprise several modules, being hardware and/or software modules, configured and operable to communicate between the modules and with the one or more antenna units and the modem unit. The processor may also be configured to provide suitable input and output connections to allow user operation such as setting preferences, initiating call or data transfer etc. Specifically, the processor unit comprises at least an antenna orientation optimizer module and a network registration module. The antenna orientation optimizer module is generally configured and operable to control phase variations between the different antenna elements of the phased array antenna units. Such phase variations indicate appropriate direction (e.g. azimuth and elevation) for transmission and reception of signals. The network registration module is configured and operable for registering the system to a network provided by a suitable hub communicating through a satellite.

It should be noted that as the device may change its location with time, the satellite selected for communication may vary. To support mobile satellite communication, one or more hub terminals, configured for maintaining the one or more communication networks, may be used. The hub terminal(s) is/are generally configured to provide a stable communication path with a plurality of geostationary satellites and thus provide communication to mobile devices. The hub terminal(s) may also be connected to one or more ground communication networks such as one or more cellular networks and/or the Internet, to provide external communication.

Each hub terminal may be configured for supporting a predetermined number of mobile systems within a region covered by transmission of a single satellite. To this end, the hub terminals may be configured to provide continuous beacon transmission in at least a dedicated common control channel, as well as supporting a predetermined number of private communication channels to be assigned to operating mobile systems/users upon registration. Generally, each of the private communication channels is defined by a pair of downlink and uplink frequencies, where the downlink frequency is used for transmission from the hub through the corresponding satellite and to a mobile system, and the uplink frequency is used for transmission from the mobile system through the satellite to the hub.

To provide optimized communication with a small form factor antenna unit, the technique of the invention may utilize a dual alignment process. In this connection a mobile system may be configured to establish modem synchronization by a first coarse alignment based on a common control signal transmitted by a network hub. When initial synchronization is achieved, a close loop alignment may be used for tuning of the antenna alignment and improving communication quality. Thus, for the initial alignment, a first low data rate is used, utilizing high efficiency error correction techniques at the cost of data transmission rate. When synchronization is achieved, data transmission may generally include data about direction of transmission and the hub may generally send corresponding data on quality of communication. This thus allows tuning of alignment in fine scanning, as well as the use of conical scanning techniques, to maintain synchronization while the system is moving. The data rate at this stage may be increased as synchronization is achieved, and, in active mode, a second, higher data-rate may be used.

Thus, according to one broad aspect of the present invention there is provided a system for satellite communication comprising:

(a) one or more antenna units configured for receiving and transmitting electromagnetic radiation at one or more frequency ranges;

(b) a modem unit connected to the one or more antenna units and configured for modulating input signals received by said one or more antenna units to electronic data and modulating output electronic data to signals in one or more predetermined frequency ranges to be transmitted by said one or more antenna units;

(c) a processor unit connected to said one or more antenna units and to said modem unit, the processor unit comprising:
  i) antenna orientation optimizer module configured and operable for varying at least one of azimuth and elevation of signal transmission and reception of said one or more antenna units; and
  ii) network registration module configured and operable for registering the system to a communication network, said registering comprising: selecting a free private communication channel from a list of free channels provided by the network, generating a signal comprising a selected sequence for transmission to a hub through the satellite, and configured and operable to be responsive to an appropriate notification signal from the hub in said private communication channel.

Generally, the system may be configured for communication through a geostationary satellite.

According to some embodiments, the antenna optimizer module may be configured and operable for further varying polarization of signal transmission and/or reception of electromagnetic radiation by said one or more antenna units.

Typically said one or more antenna units may comprise at least a transmitting phased array antenna and a receiving phased array antenna. The antenna orientation optimizer module may be configured to vary phase relations between antenna elements of the transmitting phased array antenna units and vary phase relations between antenna elements of the receiving phased array antenna units to thereby direct orientation of transmission or reception of electromagnetic radiation signals by said transmitting and receiving phased array antenna units.

According to some embodiments, the processor unit may further comprise an initializing module, wherein the initializing module is configured and operable for detecting common control signals from a network. Said detecting comprises: identifying available regional hub stations from a predetermined list of network hub stations, locating at least one satellite associated with at least one of said available regional hub stations, determining data about corresponding direction and frequency of a common control channel, and providing said direction and frequency data for each of said at least one satellite to the antenna orientation optimizer module and providing the frequency data to the modem unit with an indication of said frequency for a corresponding received signal in said common control channel. Additionally, the processor may be configured and operable to wait for a corresponding indication signal received from the network. The initializing module may be configured to repeatedly select a network and corresponding common control channel until said corresponding input signal is detected.

The modem unit may be configured and operable to be responsive to a preamble beacon signal and to adjust frequency of input signals in accordance with data received in said preamble beacon signal. Additionally or alternatively, the modem unit may be configured and operable for generating a notification signal indicating said processor unit when synchronization to a common control channel is achieved. The processor unit may also be configured and operable for generating a notification signal indicating the network registration module when proper indication about synchronization is received from the modem unit.

The initializing module may further be configured to extract from the received common control signal a list of available private channels for communication through the network and to inform the network registration module. The network registration module may be configured for selecting a free private communication channel from said list of available private channels and to direct said antenna orientation optimizer module for aligning transmission and reception directions of said one or more antenna units accordingly. The network registration module may be further configured and operable to be responsive to input signal in said free private communication channel indicating availability of said selected free private communication channel.

Additionally or alternatively, the network registration module may be configured for selecting the signal sequence, and for indicating the modem unit for repeatedly transmitting said selected sequence through a free private communication channel selected from said list of available private channels. The network registration module may also be configured and operable to respond to input communication from said hub, which is indicative of said selected sequence and data on quality of transmission. The selection of a free private communication channel may be random selection. Additionally, the network registration module may be configured for repeating said random selection in accordance with appropriate indications from the processor unit.

According to some embodiments, the system may be configured for selectively operating in either idle mode or active session mode, such that when operating in idle mode the modem unit operates to transmit spread signals at a first data rate, when operating in active mode the modem is operating for transmitting signals at a second higher data rate. The first data rate may comprise spreading of output transmitted signals; additionally or alternatively the first data rate may be below 5 Kbps. This may be used to allow high efficiency error correction on input and output signals at both ends of the communication (i.e. at the system end and/or at the hub end). The second data rate may be between 10 Kbps and 200 Kbps and at time between 10 Kbps and 500 Kbps, e.g. to support voice communication and certain levels of data communication.

The processor unit may be responsive to input data indicative of a request for engaging an active data session to thereby operate the system in active mode. The processor unit may also be responsive to proper indication received through the network. To this end the network registration module may be configured and operable to be responsive to an input signal indicative of a request for initializing active session mode and to provide a corresponding indication to the processor unit.

According to some embodiments, the antenna orientation optimizer module may be configured to vary at least one of the azimuth and elevation for transmission and reception directions of said one or more antenna units in accordance with data on location and orientation of the system. To this end, the system may further comprise one or more location and orientation sensors configured to provide location and orientation data on the one or more antenna units, and provide such location and orientation data to the processor unit. Such one or more location and orientation sensors may comprise at least one of the following: mechanical compass, electronic compass, one or more accelerometers, GPS.

According to yet some embodiments, the antenna orientation optimizer module may be configured to vary azimuth and elevation of transmission and reception of said one or more antenna units in accordance with data about satellite locations. The system may further comprise a storage unit, said storage unit comprising data about satellite locations and corresponding communication networks.

It should be noted that according to some embodiments of the invention, the system may comprise local input and output connection modules configured for local communication with an external electronic device for data exchange over said network. For example, the system may allow a user to initiate and handle communication sessions utilizing an external handheld electronic device (e.g. Smartphone, personal computer or any other type of handheld communication device having proper communication capability).

According to one other broad aspect of the invention, there is provided a method for use in satellite communication, the method comprising:

(a) providing data on location of a satellite and data on a frequency range of a common control channel transmitted through said geostationary satellite;

(b) applying a corresponding phase pattern to input data received from a phased array antenna in said frequency range to detect a beacon signal in said input data and detect a common control signal provided by a network hub in said common control channel through said geostationary satellite; and (c) synchronizing communication with the hub on said common control channel.

According to some embodiments, said satellite is a geostationary satellite.

According to some embodiments, the method may further comprise verifying said synchronizing to the common control channel, and selecting an additional communication frequency upon identifying that said synchronizing has failed.

Additionally or alternatively, the method may further comprise processing said common control signal to determine a list of available private communication channels, selecting one of said available private communication channels for registering to the network hub through said selected private communication channel. Said selecting one of said available private communication channels may be a random selection.

According to some embodiments, said registering to the network hub may comprise: applying a phase pattern to the phased array antenna for receiving a downlink beacon signal in a downlink frequency of said selected private communication channel; calibrating a transmission phased array antenna in accordance with the determined phase pattern and transmitting a registration signal in an uplink frequency of the private communication channel to enable completion of the registration upon receiving an acknowledgement signal indicating registration. Generally, transmission of said registration signal may utilize a spread transmission rate.

According to some embodiments the method may determine whether the registration is complete, and selecting one other private communication channel for registering, upon identifying that the registration has failed.

The method may further comprise selectively transmitting an active session request for establishing a direct communication link with said hub.

Location data may be repeatedly provided, to determine variations in data on location of said satellite and for periodically synchronizing to said common control channel. The location data may be provided by reading data on location and direction of orientation from one or more location and orientation sensors comprising at least one of: GPS, accelerometer, magnetic compass, electronic compass.

According to some embodiments, the method may comprise repeatedly varying the phase pattern to the phased array antenna around said location data for detecting relative movement of the phased array antenna with respect to said geostationary satellite.

According to yet another broad aspect of the invention there is provided a program storage device readable by machine, tangibly embodying a program of instructions executable by the machine to perform a method for use in satellite communication, said method comprising:

provinding data on location of a geostationary satellite;
providing data on communication frequency of a common control channel through said geostationary satellite;
applying a corresponding phase pattern to input data received from a phased array antenna to detect a beacon signal and detecting a common control signal provided by a network hub through said geostationary satellite; and
synchronizing to said common control channel.

According to yet another broad aspect of the invention there is provided a computer program product comprising a computer useable medium having computer readable program code embodied therein for use in satellite communication, the computer program product comprising:

computer readable program code for causing the computer to provide data about location of a geostationary satellite;
computer readable program code for causing the computer to provide data about communication frequency of a common control channel through said geostationary satellite;
computer readable program code for causing the computer to apply a corresponding phase pattern to input data received from a phased array antenna to detect a beacon signal and detecting a common control signal provide by a network hub through said geostationary satellite; and
computer readable program code for causing the computer to synchronize to said common control channel.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
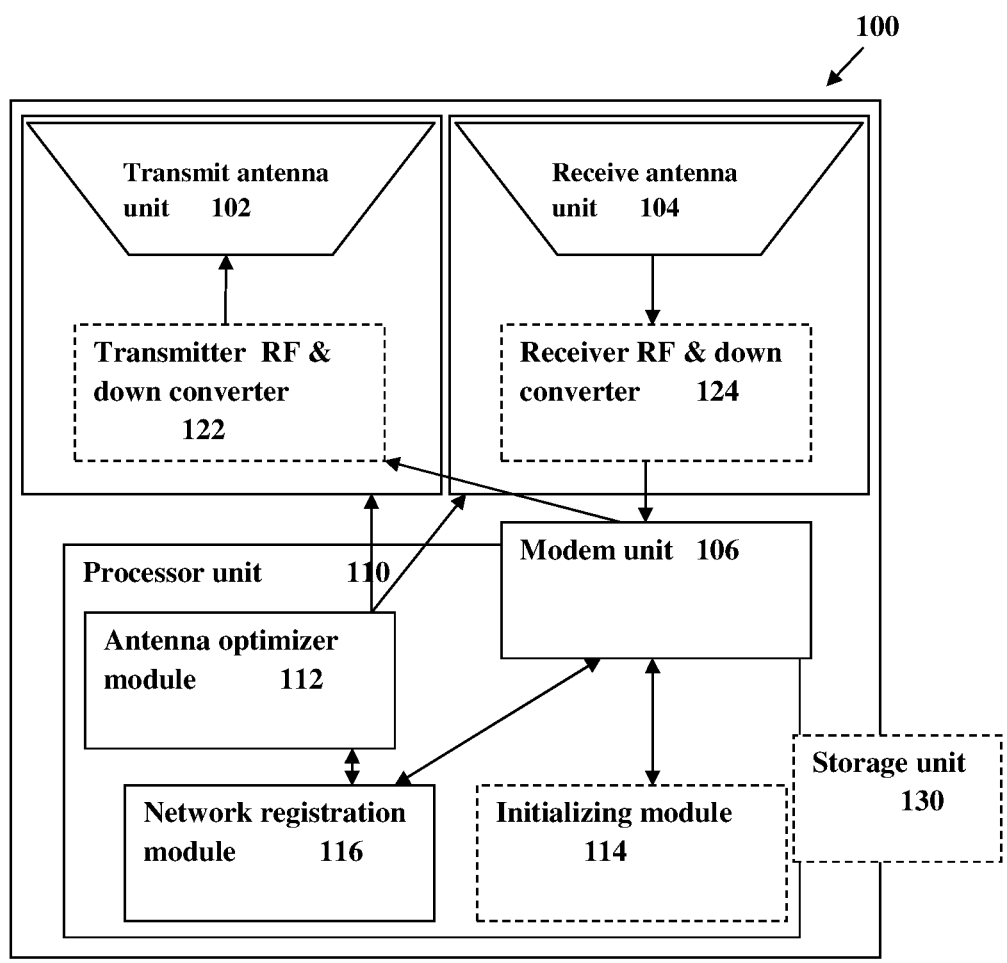
FIG. 1 schematically illustrates a mobile communication system according to embodiments of the present invention.

As indicated above, the present invention provides a mobile communication system for transmitting and receiving data through one or more satellites. Reference is made to FIG. 1 schematically illustrating a system 100 for use in satellite based communication according to the present invention. The system 100 includes one or more antenna units; two such antenna units 102 and 104 are shown, at least one modem unit 106 and a processor unit 110. The system 100 may generally also include storage unit 130, or be connectable to such storage unit, a power supply unit, and one or more utilities for local input and output, which are not specifically shown in the figure.

The one or more antenna units are configured for receiving and transmitting electromagnetic radiation at one or more predetermined frequency ranges. Generally, the system may utilize two antenna units 102 and 104 as exemplified in the figure. The antenna units may be selected such that a first antenna unit, e.g. 102, is a dedicated transmitting antenna and a second antenna unit, e.g. 104, is a dedicated receiving antenna. Additionally, as shown in the figure, the antenna units may be configured as antenna elements being connected to corresponding RF and converter units 122 and 124. The RF and converter units 122 and 124 may be configured for extracting RF signals from the suitably modulated input signal received by the antenna and/or modulate a signal to be transmitted on a carrying frequency for appropriate transmission. For example, in the receiving antenna unit 104 the RF and converter unit 124 may include a low noise RF amplifier and a down converter unit. In the transmitting antenna unit 102 the RF and converter unit 122 may include a power amplifier and an up converter unit.

The antenna unit(s) is/are connected to a modem unit 106, which is configured for de-modulating input signals to electronic data to be processed by the processor unit 110 as well as to receive output electronic data from the processor unit 110 and generate (modulating) corresponding signals for transmission by the antenna units. The modem unit 106 may or may not be a part of the processing unit 110 in accordance with structural design of the system 100.

The processor unit 110 is connected to the one or more antenna units 102 and 104 and to the modem 106 and is configured and operable for operating the antenna units to transmit and receive signals corresponding to various network activities, as well as communicating over the network. Such network activities generally include identifying a satellite that provides a suitable communication network; setting the antenna unit with appropriate direction for reception and for transmission of signals to and from the satellite; identifying network ID; registering to an available network; and responding to or engaging in active communication sessions through the network. To this end, the processor unit may generally include at least an antenna optimizer module 112 and a network registration module 116. It should be noted that the processor unit 110 may include one or more additional modules such as initializing module 114 (shown in dashed lines) and other modules that are not specifically shown. It should also be noted that the modules may be hardware or software operation modules and may be embodied in one or more physical processing elements defining together the processing unit 110.

The antenna orientation optimizer module 112 is configured and operable for varying azimuth and elevation, and in some embodiments also polarization, for transmission and reception of said one or more antenna units. In this connection it should be noted that, the one or more antenna units 102 and 104 are preferably phased array antenna units. Generally, phased array antenna is configured from an array of antenna elements operable for transmission/reception of electromagnetic (EM) signals, such that different elements of the array are operated with small phase difference with respect to other elements of the array. Appropriate control on the phase relations between different elements of the antenna array provide control over direction of transmission of EM signals (or direction from which a signal is received). Generally, the technique of the present invention allows the use of small form factor phased array antenna units by providing registration protocols allowing low gain transmission and reception elements. In this connection it should be noted that data transmission utilizing low gain antenna units might generate data transmission errors and increase synchronization time. The technique of the present invention utilizes relative low data rate of communication (e.g. a few hundreds of bits per second up to a few kilobits per second) for initialization and registration. This is while the systems, as well as the network hub, are configured to switch into active mode and communicate with relatively higher data rate (e.g. tens to hundreds of kilobits per second).

More specifically, and as will be described in more detail further below, the technique of the invention allows dual mode communication, wherein, in idle mode, the system is configured to transmit and receive data bits at a lower bit-rate, allowing the use of various error correction techniques and thus enabling synchronization utilizing low received signal power, herein referred to as low gain synchronization. When an active communication session is initiated, either by a user or by receiving an appropriate request from the hub (e.g. incoming call), the system and the hub are configured to communicate at a higher data-rate utilizing the synchronization already achieved in the registration. Generally the system may utilize various tracking techniques, such as conical scan, to maintain communication while in active communication mode.

In this connection, the network registration module 116 is configured and operable for registering the system to a network provided by a corresponding hub through a satellite. The registration process generally includes selection of an available/free private communication channel and transmitting a signal formed by a selected sequence to the hub and being responsive to an appropriate notification from the hub that registration is complete. Generally, the mobile communication system 100 is configured for periodically registering to the network provided in the corresponding region. This allows the system to receive indication of incoming data transmission sessions such as an incoming telephone call, short text message, email or any other data transmission session. Additionally, registration to the network is needed to initiate a data transmission session, such as an outgoing telephone conversation, sending short text messages, emails or any other outgoing data transmission session. In this connection, and as indicated above, communication for registering to the network may generally be transmitted (by the system and by the hub) at a relatively low data-rate. More specifically, the registration signals, including downlink beacon and request to connect to a private channel, may be transmitted in a spread signal/spread spectrum technique and in 1:4 to 1:10, and at times to 1:50 or 1:100, or generally below 1:1000, such data spreading ratios enabling high error correction and fast synchronization.

Additionally, according to some embodiments, the processor unit 110 may further include an initializing module 114. The initializing module is configured and operable to be responsive to a common control signal (CCS) associated with a network hub. Such a common control signal may be continuously transmitted by every network hub, at a predetermined corresponding frequency channel, designated as a common control channel (CCC), and may include data indicative of the specific network (network identifier) and data on available private communication channels. Generally the CCS may include additional data such as time indication provided to assist mobile communication systems in calibration. Thus, the initializing is generally configured and operable to determine available regional hub stations, operating through satellites that are in communication range, and provide information indicative of location of the corresponding satellites and their associated CCC's to the antenna optimizer module 112 and the modem unit 106 respectively. As indicated above, the antenna optimizer module 112 is configured for determining proper direction (azimuth and elevation) from which the CCS is to be detected, and optimizes the receiving antenna unit 104 accordingly. The antenna optimizer module 112 together with the modem unit 106 is also provided with the frequency of the CCC to extract the CCS from input radiation received by the antenna unit 104. It should be noted that a list of global satellite locations and network hubs may be preinstalled in the system 100 (e.g. in a storage unit 130) and may be updated periodically.

As indicated, the system 100 of the present invention is preferably configured to be a mobile system, having a relatively small form factor. The system 100 may be configured to be in the form of a handheld device having physical dimensions of a few centimeters. To provide such a small form factor, the system 100 is preferably configured with small form factor phased array antenna units, e.g. having dimensions within a range between 50 mm×50 mm and 130 mm×130 mm for a receiving antenna 104 unit and similar dimensions for the transmit antenna unit 102. To this end, the phased array antenna units may be configured by a 4×4, 5×5, or 6×6 antenna element, or any combination of N×M where N and M are between 4 and 25 or between 4 to 16 or further between 4 and 12, or generally below 33×33.

In this connection it should be noted that the number of elements in a phased array antenna unit may determine stirring characteristics of the antenna unit. Generally, a large number of antenna elements in a phased array antenna unit results in the antenna's ability to provide a narrow beam of transmission (or reception), and thus to support higher gain. The use of phased array antenna units with a reduced number of antenna elements according to the present invention allows, on the one hand, a low form factor system configuration that is suitable for mobile use, while it requires a communication method suitable for establishing and maintaining communication utilizing low gain receiving/transmitting antenna units. Additionally, the use of a reduced number of antenna elements in the phased array antenna unit results in a wider beam (wide angular field for transmitting and receiving) and thus reduces the required precision for directing the antenna to the desired satellite for proper communication.

It should also be noted that according to some embodiments, the antenna unit may be operated utilizing only a portion of the radiating/receiving antenna elements. More specifically, if a phased array antenna unit includes 10×10 antenna elements, only one out of four elements is used to provide an array of 5×5 elements. This enables to further broaden the angular distribution of the transmitted/received radiation to thereby simplify detection of satellite location (at the cost of increased noise and reduced gain).

Thus, the technique and system as described herein utilizes a registration process tailored to provide reliable communication while utilizing mobile, small form factor antenna units. The communication technique is designed to eliminate, or at least significantly reduce the need for accurate calibration of the antenna units with respect to temperature variations, which are generally known to vary transmission properties and appropriate phase relation in common phased array antenna units. To this end, the system and technique of the invention are generally designed to operate at a relatively low bit-rate for providing mainly voice communication; however they may also be used for data communication, such as short text messages, email messages and various other data types for communication. Generally, the communication network and the mobile satellite communication system may be configured to support communication through geostationary satellites at a bit rate of between 10 Kb/s to 200 Kb/s or up to 500 Kb/s. Generally, the use of a relatively low bit rate for communication allows for improving antenna and receiver sensitivity, and thus enables the system to establish reliable communication using limited gain antenna units. This in turn allows the use of small form factor antenna units and providing a mobile communication system. Additionally, as sensitivity of reception both at the system/terminal side and at the hub side, allows for transmission with reduced energy, it thus enables to utilize a battery type power supply unit. It should be noted that, as generally known in the art, the satellite itself does not take an active part in the communication, other than receiving the input signal, amplifying the signal and transmitting the amplified signal.

Figure 2:
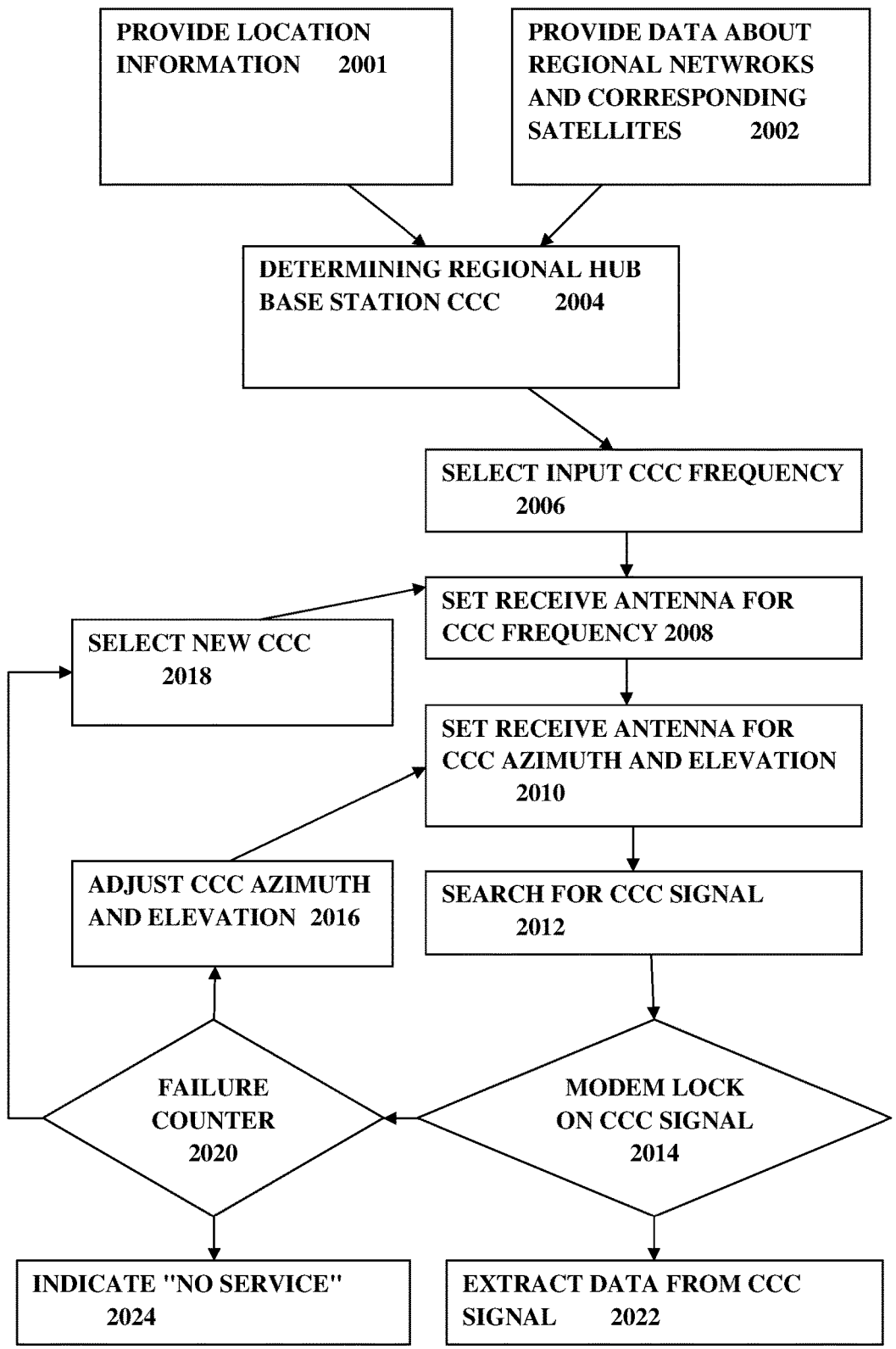
FIG. 2 illustrates a communication initiating process according to some embodiments of the invention.
Figure 3:
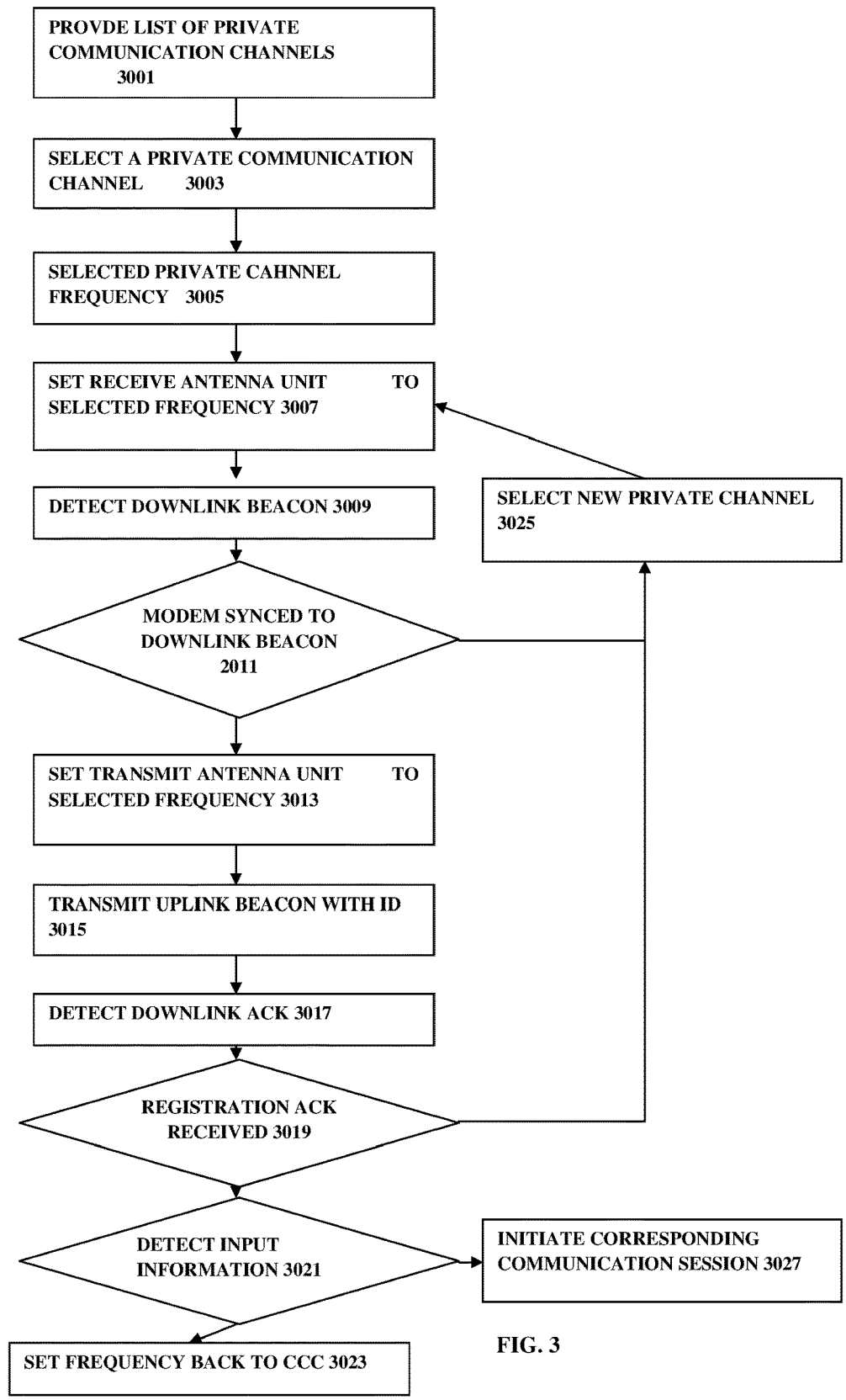
FIG. 3 illustrates the step of a registration process according to some embodiments of the invention.

In this connection, reference is made to FIGS. 2 and 3 schematically illustrating initialization and registration processed according to the presently described technique. As indicated above, the registration processes may generally be performed periodically by the system to provide continuous communication with a suitable network and be responsive to input communication sessions, i.e. to be available to incoming calls.

FIG. 2 illustrates an initializing process, which may be performed upon system start up or after loss of communication. To initialize connection to a network, data about location of the system 2001, as well as data about regional networks and satellites 2002, is generally provided. The location data may utilize GPS based location as well as any other location technique. The location data is used to select a geostationary satellite such that the system is located within transmission range thereof. The data on regional networks may generally be stored in a storage unit of the system and may be updated periodically if needed. The data on regional networks and satellites may generally include location of geostationary satellites used by suitable communication networks as well as frequency channels of the Common Control Channel corresponding to the networks. Based on the location of the system, network information and satellites providing the network within range, the regional hub base station and corresponding common control channel (CCC) are determined 2004. The corresponding frequency is selected 2006 such that the received antenna unit and the modem unit are set to the corresponding frequency 2008. Generally, according to some embodiments, the CCC frequency, as well as additional communication channel frequencies, is selected to be within frequency range of at least one of the Ku band, K band and Ka band, i.e. within the range of 12 GHz to 18 GHz (Ku band); 18 GHz to 27 GHz (K band); and 26.5 GHz to 40 GHz (Ka band) as defined by the Institute of Electrical and Electronics Engineers (IEEE).

In addition to setting the input frequency, the antenna unit is generally set to receive input signals coming from the general direction of the selected satellite 2010. The direction from which signals transmitted from the corresponding satellite arrive may be set by providing appropriate phase relations to input EM radiation detected by different antenna elements of the phased array antenna unit. Such phase variation corresponds to azimuth and elevation of the satellite with respect to the system. To this end, the phase variation may be determined by scanning input EM signals with possible phase variations to detect maximal signal at the CCC frequency. Alternatively, an estimated phase relation corresponding to the satellite location may be applied, and varied slightly to maximize signal detection. Such estimated phase relation may be also determined in accordance with orientation of the system, which in turn may be determined by one or more accelerometers. Thus, in some embodiments, the azimuth and elevation may be determined in combination with a search for the CCC signal 2012, while in some other embodiments, an estimated phase relation corresponding to the azimuth and elevation may be determined, and varied to detect the CCC signal 2012. It should be noted that during initial search for input signal, the phase variations applied to the antenna unit (e.g. by the antenna optimizer module) may be coarse variations. For example, such initial phase variations may correspond to angular variation of 2-10 degrees for each scanning step. It should also be noted that the use of a limited number of antenna elements in the phased array antenna units results in a relatively wide angular field of reception, and thus enables such a coarse search.

At this stage, the modem unit attempts to lock on to the detected CCC signal 2014. Such locking may be defined by successful extraction of network data from the received signal 2022. However, in some embodiments, the CCC signal may include sufficient bits for data reconstruction such that a lock may be determined before the corresponding data is extracted. Generally, even when the modem unit is locked on the CCC signal, a scan for the exact location of the corresponding satellite, i.e. effective source of the signal, may continue. This is to enable mobile communication and to prevent interruption due to changes in location/orientation of the system. Specifically, if the initial scan for the CCC signal is relatively coarse, the ongoing scan between modem sync to the end of the communication session may be finer. Such a fine scan may include an ongoing conical scan and phase variation corresponding to less than 2 degree beam variation. If the modem fails to lock on to the CCC signal, the azimuth and elevation for CCC detection may be adjusted 2016; a new network, providing a different CCC may be selected 2018; or a failure to connect notification may be provided 2024. The selection of a suitable action in case of failure may be determined in accordance with a suitable counter 2020 used to determine the number of attempts to connect. Generally, at a first failure, as well as a predetermined number of initial failures, the phase relations (corresponding to azimuth and elevation) may be varied to compensate change in conditions of the antenna or wrong initial estimation of the parameters. When a predetermined number of attempts to locate the signal are unsuccessful, a different network may be sought, providing CCC at a different frequency. If no signal is detected after repeated attempts, a suitable notification may be provided, such as a "no service" notification, indicating that no satellite reception is detected.

The registration to a communication network is generally a periodic process required to maintain connection and be responsive to incoming communication sessions. Reference is made to FIG. 3 exemplifying the registration process according to some embodiments of the present invention. The registration is generally performed based on network data such as satellite location and communication channels' frequency bands. Such data may be provided through the CCC signal of the network. The list of private channels, generally listing the available private channels is provided 3001. This list may preferably be extracted from the CCC signal; however in some embodiments, data indicating the list of private channels may be stored in a storage unit of the device. From the list, a certain available communication channel is selected 3003. Typically, to avoid double selection, where two different systems are trying to register through the same channel simultaneously, the selection may be random. However, alternative algorithms for selection may be used.

After selecting a private communication channel, the modem and receive antenna unit are set for receiving input signals at the selected frequency 3005. It should be noted that generally a private communication channel includes a down link frequency, used for transmission from the hub through the satellite to the mobile communication system, and an uplink frequency, used for transmission from the mobile device through the satellite to the hub. Thus, the receive antenna is set for detection of input signals at the downlink frequency of the selected channel to detect a downlink beacon signal 3009. The downlink beacon signal is continuously transmitted by the hub in each available private communication channel to identify the availability of the channel and assist communication systems in registration to the network. Before transmission, the modem should preferably be locked on the downlink beacon 2011. If no lock is achieved, the channel may already be used by a different system, or the antenna unit may not be set correctly. To simplify operation, a different channel may be selected (e.g. randomly) and a search may be performed for a beacon signal at a different downlink frequency. It should be noted that by setting the antenna unit to a selected frequency, the phase relations between phased array antenna elements, when such an antenna is used, may be changed accordingly. Additionally, change in location of the system may be used to continuously update relative azimuth and elevation of the satellite with respect to the system. In this connection, an initialization process, as described above, may be used periodically.

Once the downlink beacon is detected, the transmitting antenna may be set to the uplink frequency of the selected channel 3013. This may generally include the uplink frequency together with phase relation in accordance with the relative direction for transmission. An uplink beacon may be transmitted to establish communication with the hub 3015. The uplink beacon includes a registration sequence, which may generally include a selected sequence identifying the system, and preferably includes a randomly selected sequence. Additionally the uplink beacon may generally include the transmission direction, i.e. the current phase relations between antenna elements of the phased array antenna units. This is to establish a closed loop calibration cycle with the hub to optimize direction for transmission.

Generally, upon receiving such registration sequence, the network hub identifies that transmitting system transmits the same registration sequence back to the system in the downlink channel 3017. The hub may add to the returning sequence, data on the strength of the received signal, as well as network data such as indication about a waiting communication or an invitation to initiate a communication session (e.g. incoming telephone call etc.). The return signal may be used for further optimizing the direction for transmission and reception as well as to enable communication while the system is mobile and moving. The process may generally require indication that the acknowledgement signal is received 3019. If no acknowledgment signal is received, a different private channel may be selected 3025. This may be because a different system is trying to register on the same channel, or that transmission is interrupted for other reasons. When the acknowledgement signal is received, it is processed to determine if any additional information is included, inviting initiation of an active session 3021. If such information is received, an active communication session may be initiated 3027. Alternatively, if no specific information is received, the registration process is over and the private communication channel is released 3023.

A substantially similar registration may be applied when a user initiated active session is requested. In this case, the uplink beacon may include a request for initiating an active session in the selected private channel. In this connection, it should be noted that transmission of data in the private communication channels may be provided in either an idle mode or active mode. The idle mode includes registration as described above, and is characterized by signal transmission in a first, lower, bit-rate to preserve power and to provide higher gain and assist in detection of the network. This is while in the active mode, data may be transmitted in a second, higher, bit-rate to provide proper communication. For example, the first bit rate may be around a hundred to a few kilo bits per second, while the active mode may use the full bit-rate of the system (e.g. a few hundred kilo bits per second).

Additionally, according to some embodiments, communication in idle mode may utilize a spread-spectrum technique or other bit spreading techniques. In the spread spectrum technique, the signal is spread in the frequency domain to utilize greater bandwidth with lower bit-rate. Alternatively, the signals may be speared in the time domain to transmit the same signal with a lower bit-rate. These techniques may be used to simplify communication when high bit-rate is not required and to allow detection of the beacon signals with a small form factor and relatively cheap antenna units.

Additionally, various error correction and detection techniques may be used in signal transmission. In idle mode, error correction may be used to allow modem synchronization and data transfer while utilizing low gain antenna to enable simple and fast registration to the network. In the active mode, a larger amount of data may be transmitted and either error correction or error detection techniques may be used in accordance with the required bit-rate for communication and amount of data to be transmitted.

It should be noted, and as described above, that the technique, system and device according to the present invention are generally configured to provide communication with relatively low data transmission rate. More specifically, to support efficient mobile communication through geostationary satellites, the technique of the present invention may typically be directed at efficient communication over the need to transmit high data rates. When in the active mode, the communication system 100 is typically configured to enable communication at ten to a few hundreds of Kilobits per second. This is while in idle mode, for initial synchronization and registration to a network, the system may utilize communication in a few hundreds of bits per seconds and up to a few Kilobits per second. This reduced data-rate is used to allow modem synchronization to input signals even if the antenna direction (phases) is not optimized to the direction from which the signal is sent. After initial synchronization, the antenna optimizer may operate to improve the calibration using closed loop communication with the hub. After antenna optimization is successful, the modem unit may be switched to the higher bit rate, e.g. for communication in active mode and/or system operations as the case may be.

Generally, the downlink receiver in the modem may be configured for transmitting data indicating the received signal quality before and after initial synchronization. As indicated above, the use of lower bit rate for initial communication and registration enables synchronization while does not specifically require optimized alignment of the antenna units. When modem synchronization is achieved, closed loop communication with the hub enables fine tuning of the antenna alignment/directionality to support higher data-rate for communication by improving signal quality.

Optimizing data transmission may be substantially similar, while it requires established communication with the hub. As indicated above, an output signal transmitted by the system may include data on direction of transmission (azimuth and elevation and/or corresponding phase relations of the antenna unit), whereas the hub transmits a return signal including data about quality of the transmission to enable tuning of antenna alignment. In this communication direction, the use of reduced data-rate allows the hub to detect the uplink transmission signals for optimized and non-optimized antenna alignment. It should also be noted that generally any transmission signal, uplink and downlink may be time tagged, i.e. include data on time of transmission. This is to enable efficient communication and synchronization while the system may be moving. Additionally, this allows the system to optimize antenna alignment based on previous communications. For example, the system may use time tagging of transmission to determine the phase relations for antenna elements at the time when highest signal quality has been achieved and to integrate data from location and orientation sensors (e.g. GPS and accelerometer(s)) to determine current phase relations for transmission.

Thus, the present invention provides a novel system and method for use in mobile satellite based communication. The technique of the invention provides a relatively simple and low-cost communication network utilizing existing geostationary satellites to provide global coverage. Those skilled in the art will readily appreciate that various modifications and changes can be applied to the embodiments of the invention as hereinbefore described without departing from its scope defined in and by the appended claims.

The invention claimed is:

1. A system for satellite communication, the system comprising:
    (a) one or more antenna units configured for receiving and transmitting electromagnetic radiation at one or more frequency ranges;
    (b) a modem unit connected to the one or more antenna units and configured for de-modulating input signals received by said one or more antenna units to electronic data and modulating output electronic data to signals in one or more predetermined frequency ranges to be transmitted by said one or more antenna units;
    (c) a processor unit connected to said one or more antenna units and to said modem unit, the processor unit comprising:
        i) an antenna orientation optimizer module configured and operable for varying azimuth and/or elevation of signal transmission and reception of said one or more antenna units; and
        ii) a network registration module configured and operable for registering the system to a communication network, said registering comprising: selecting a free private communication channel from a list of channels provided by the network, generating a signal comprising a selected sequence for transmission to a hub through the satellite, and configured and operable to be responsive to an appropriate notification signal from the hub in said private communication channel; and
        iii) an initializing module, wherein the initializing module is configured and operable for detecting a common control signal from a network, said detecting comprising:
            identifying available regional hub stations from a predetermined list of network hub stations, locating at least one satellite associated with at least one of said available regional hub stations;
            determining data on corresponding direction and frequency of a common control channel, and providing said direction and frequency data for each of said at least one satellite to the antenna orientation optimizer module; and
            providing the frequency data to the modem unit with an indication of said frequency for a corresponding received signal in said common control channel;
            wherein the modem unit is configured and operable to be responsive to a preamble beacon signal and to adjust frequency of the input signals in accordance with data received in said preamble beacon signal.

2. The system of claim 1, being configured for communication through a geostationary satellite.

3. The system of claim 1, wherein the antenna optimizer module is configured and operable for further varying polarization of a signal for transmission and reception of electromagnetic radiation by said one or more antenna units.

4. The system of claim 1, wherein said one or more antenna units comprise at least a transmitting phased array antenna and a receiving phased array antenna; said antenna orientation optimizer module is configured to vary phase relations between antenna elements of the transmitting phased array antenna units and vary phase relations between antenna elements of the receiving phased array antenna units to thereby direct orientation of transmission or reception of electromagnetic radiation signals by said transmitting and receiving phased array antenna units.

5. The system of claim 1, wherein:
    the modem unit is configured and operable for generating a notification signal indicating said processor unit when synchronization to a common control channel is achieved; and
    the processor unit is configured and operable for generating a notification signal indicating the network registration module when proper indication about synchronization is received from the modem unit.

6. The system of claim 1, wherein the initializing module is configured to repeatedly select a network and corresponding common control channel until said corresponding input signal is detected.

7. The system of claim 1, wherein said initializing module is configured to extract from the received common control signal a list of available private channels for communication through the network and to inform the network registration module; said network registration module is configured for selecting the free private communication channel from said list of available private channels and to direct said antenna orientation optimizer module for aligning transmission and reception directions of said one or more antenna units accordingly.

8. The system of claim 7, wherein the network registration module is further configured and operable to be responsive to the input signal in said free private communication channel indicating availability of said selected free private communication channel.

9. The system of claim 1, configured for selectively operating in either idle mode or active session mode, such that when operating in idle mode the modem unit operates to transmit spread signals at a first data rate, and when operating in active mode the modem operates for transmitting signals at a second higher data rate.

10. The system of claim 9, wherein the first data rate comprises spreading output transmitted signals.

11. The system of claim 9, wherein the network registration module is configured and operable to be responsive to an input signal indicative of a request for initializing active session mode and to provide a corresponding indication to the processor unit.

12. The system of claim 1, wherein the antenna orientation optimizer module is configured to vary the azimuth and/or elevation for the transmission and reception directions of said one or more antenna units in accordance with data on location and orientation of the system, and data on satellite locations.

13. The system of claim 12, further comprising at least one of:
one or more location and orientation sensors configured to provide location and orientation data of the one or more antenna units and provide said location and orientation data to the processor unit, said one or more location and orientation sensors comprise at least one of the following: mechanical compass, electronic compass, one or more accelerometers, GPS; and
a storage unit, said storage unit comprising data on the satellite locations and corresponding communication networks.

14. The system of claim 1, further comprising local input and output connection modules configured for local communication with an external electronic device for data exchange over said network.

15. A system for satellite communication, the system comprising:
(a) one or more antenna units configured for receiving and transmitting electromagnetic radiation at one or more frequency ranges;
(b) a modem unit connected to the one or more antenna units and configured for de-modulating input signals received by said one or more antenna units to electronic data and modulating output electronic data to signals in one or more predetermined frequency ranges to be transmitted by said one or more antenna units;
(c) a processor unit connected to said one or more antenna units and to said modem unit, the processor unit comprising:
i) an antenna orientation optimizer module configured and operable for varying azimuth and/or elevation of signal transmission and reception of said one or more antenna units; and
ii) a network registration module configured and operable for registering the system to a communication network, said registering comprising: selecting a free private communication channel from a list of channels provided by the network, generating a signal comprising a selected sequence for transmission to a hub through the satellite, and configured and operable to be responsive to an appropriate notification signal from the hub in said private communication channel; and
iii) an initializing module, wherein the initializing module is configured and operable for detecting a common control signal from a network and for extracting from the common central signal a list of available private channels for communication through the network and to inform the network registration module, said detecting comprising:
identifying available regional hub stations from a predetermined list of network hub stations, locating at least one satellite associated with at least one of said available regional hub stations;
determining data on corresponding direction and frequency of a common control channel, and providing said direction and frequency data for each of said at least one satellite to the antenna orientation optimizer module; and
providing the frequency data to the modem unit with an indication of said frequency for a corresponding received signal in said common control channel;
said network registration module is configured for selecting the free private communication channel from said list of available private channels and to direct said antenna orientation optimizer module for aligning transmission and reception directions of said one or more antenna units accordingly; and wherein said network registration module is configured for selecting the signal sequence, and for indicating the modem unit for repeatedly transmitting said selected sequence through the free private communication channel selected from said list of available private channels, and to be responsive to input from said hub which is indicative of said selected sequence and data on quality of transmission.

16. A system for satellite communication, the system comprising:
(a) one or more antenna units configured for receiving and transmitting electromagnetic radiation at one or more frequency ranges;
(b) a modem unit connected to the one or more antenna units and configured for de-modulating input signals received by said one or more antenna units to electronic data and modulating output electronic data to signals in one or more predetermined frequency ranges to be transmitted by said one or more antenna units;
(c) a processor unit connected to said one or more antenna units and to said modem unit, the processor unit comprising:
i) an antenna orientation optimizer module configured and operable for varying azimuth and/or elevation of signal transmission and reception of said one or more antenna units; and
ii) a network registration module configured and operable for registering the system to a communication network, said registering comprising: selecting a free private communication channel from a list of channels provided by the network, generating a signal comprising a selected sequence for transmission to a hub through the satellite, and configured and operable to be responsive to an appropriate notification signal from the hub in said private communication channel;
wherein the system is configured for selectively operating in either idle mode or active session mode, such that when operating in idle mode the modem unit operates to transmit spread signals at a first data rate, and when operating in active mode the modem operates for transmitting signals at a second higher data rate, and wherein the first data rate is below 5 Kbps, and said second data rate is between 10 Kbps to 200 Kbps.

\* \* \* \* \*